United States Patent
Nakagawa

[11] 3,884,556
[45] May 20, 1975

[54] RETROFOCUS WIDE-ANGLE LENS SYSTEM
[75] Inventor: Jihei Nakagawa, Tokyo, Japan
[73] Assignee: Olympus Optical Co., Ltd., Tokyo-to, Japan
[22] Filed: May 4, 1973
[21] Appl. No.: 357,267

[30] Foreign Application Priority Data
May 10, 1972 Japan.............................. 47-46084
Sept. 6, 1972 Japan.............................. 47-89313

[52] U.S. Cl. ................. 350/214; 350/176; 350/215
[51] Int. Cl............................ G02b 9/62; G02b 9/64
[58] Field of Search............................ 350/214, 215

[56] References Cited
UNITED STATES PATENTS
| | | | |
|---|---|---|---|
| 3,512,874 | 5/1970 | Woltche | 350/214 |
| 3,549,241 | 12/1970 | Mori | 350/214 X |
| 3,635,546 | 1/1972 | Mori | 350/214 |

Primary Examiner—John K. Corbin
Attorney, Agent, or Firm—Cushman, Darby & Cushman

[57] ABSTRACT

A compact retrofocus wide-angle lens systems for which aberrations are corrected favourably by using a positive meniscus lens with a large power as the first lens, negative meniscus lenses as second and third lenses and a thick positive lens as a fourth lens.

10 Claims, 31 Drawing Figures

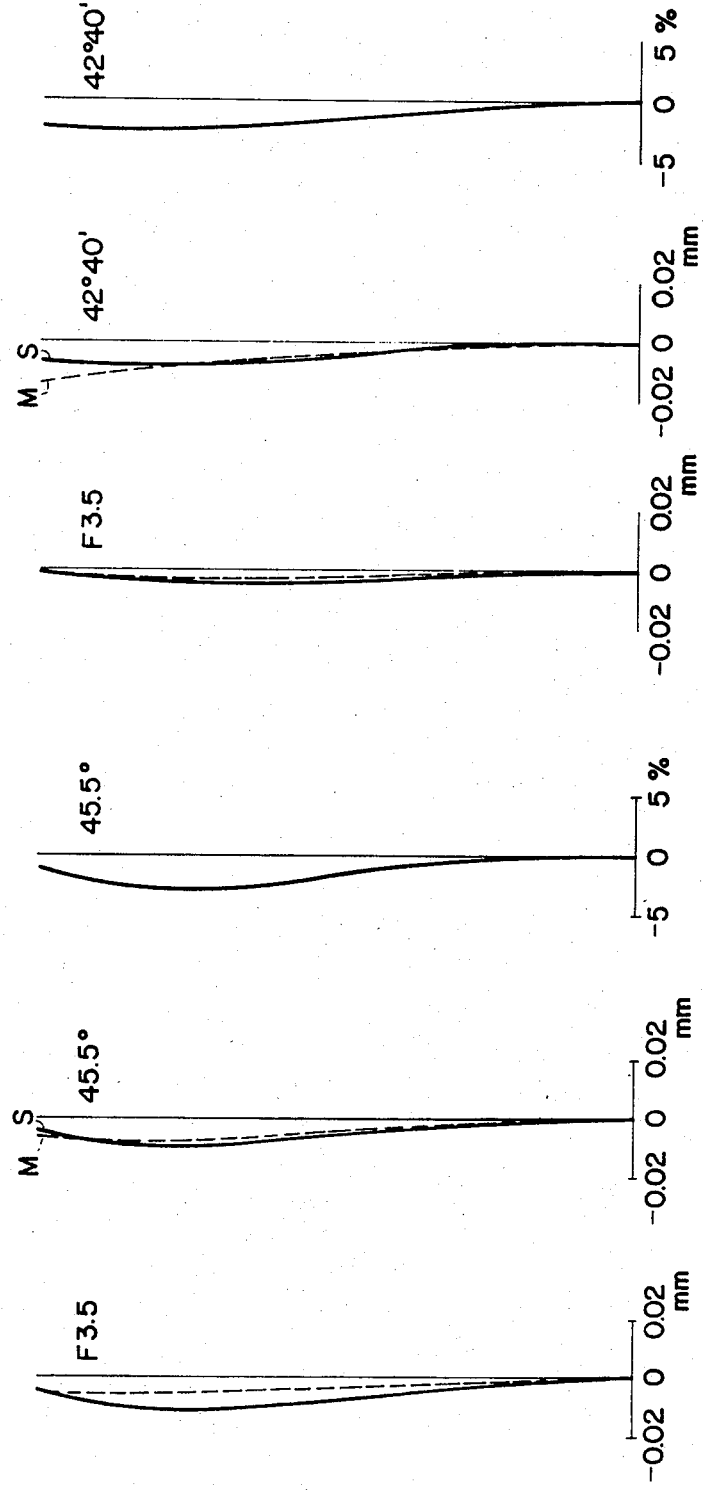

SPHERICAL ABERRATION ——
SINE CONDITION ----
ASTIGMATISM    DISTORTION

SPHERICAL ABERRATION ——
SINE CONDITION ----
ASTIGMATISM    DISTORTION

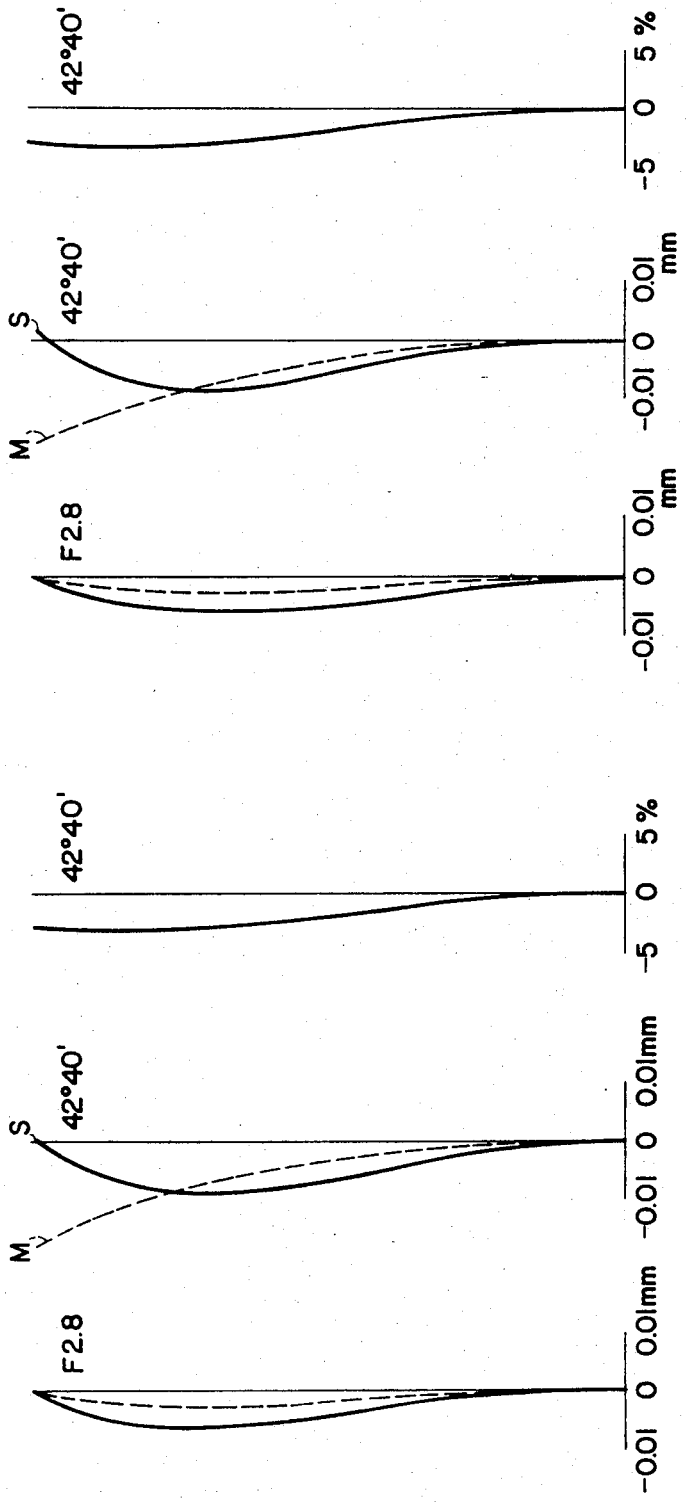

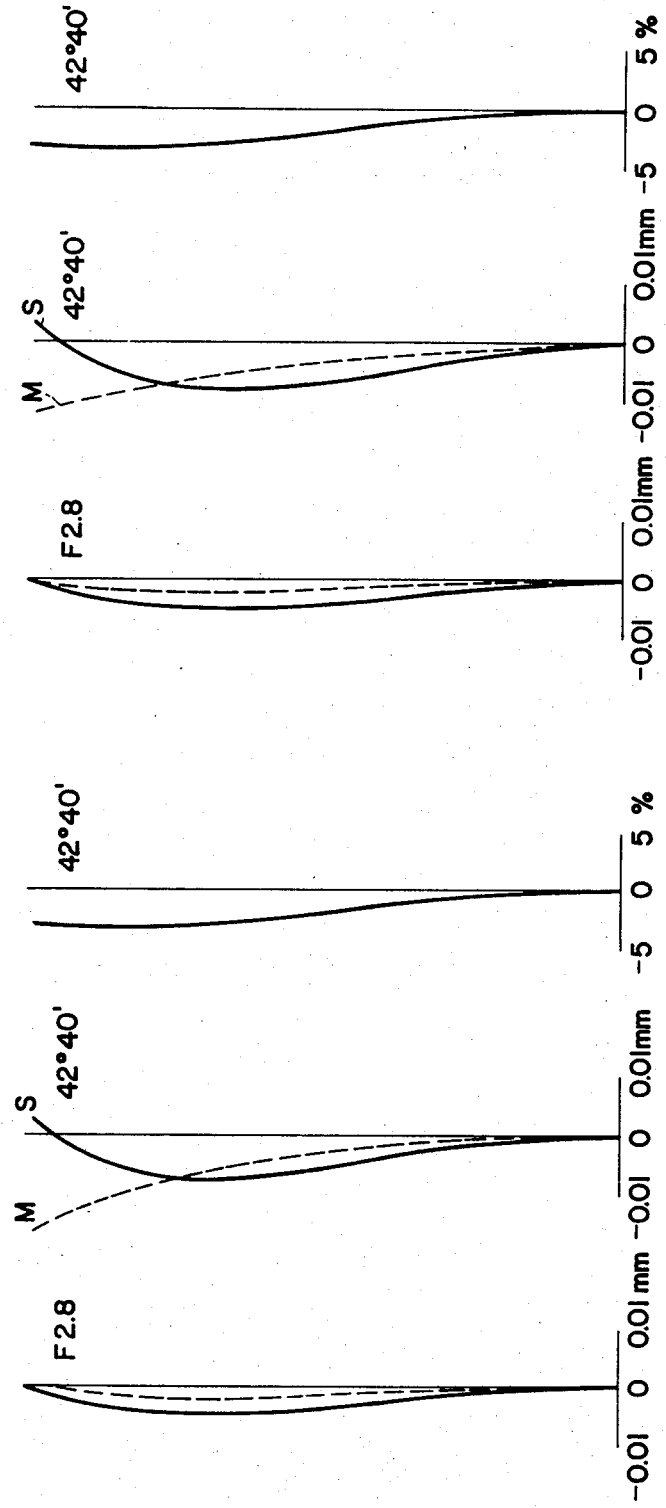

RETROFOCUS WIDE-ANGLE LENS SYSTEM

BACKGROUND OF THE INVENTION

1. Field of the Invention

The present invention relates to a retrofocus wide-angle lens system for a single-lens reflex camera.

2. Description of the Prior Art

For conventional retrofocus wide-angle lens systems for single-lens reflex cameras with long back focal length, the overall length, diameter of the front lens and number of lenses are all large. When the number of lenses are large, flare tends to occur, various difficult problems are caused in manufacture and cost is high. Moreover, in spite of the fact that the number of lenses is large, aberrations have not been corrected satisfactorily. Especially, because of the large field angle, it has been impossible to obtain a lens system for which aberrations at the marginal field angle are corrected satisfactorily.

SUMMARY OF THE INVENTION

It is, therefore, the principal object of the present invention to provide a retrofocus wide-angle lens system arranged by small number of lenses and having a small overall length and a front lens with a small diameter for which F number is F/3.5 to F/2.8 and field angle is 84° to 92° and for which aberrations are corrected quite favourably.

For the lens system according to the present invention, the first lens component $L_1$ is a positive meniscus lens, the second lens component $L_2$ and third lens component $L_3$ are negative meniscus lenses, the fourth lens component $L_4$ is a positive lens comprising a single lens, cemented lens or combined lens arranged with a small airspace, the fifth lens component $L_5$ is a negative lens comprising a single lens, cemented lens or combined lens arranged with a small airspace, and the sixth lens component $L_6$ is a positive single lens or the sixth lens component is divided into two positive lenses, that is, the sixth lens component $L_6$ and seventh lens component $L_7$. Besides, the retrofocus wide-angle lens system of the present invention satisfies the following conditions when reference symbol $f$ represents the total focal length of the lens system as a whole, reference symbol $f_{123}$ represents the total focal length of the first, second and third lens component, reference symbol $D_4$ represents the distance from the front surface to the rear surface of the fourth lens component $L_4$ and reference symbol $D_5$ represents the distance from the front surface to the rear surface of the fifth lens component $L_5$.

$$0.4f < |f_{123}| < 0.8f, f_{123} < 0 \qquad (1)$$

$$0.5f < D_4 + D_5 < f \qquad (2)$$

For ultra-wide-angle lenses, there is a general tendency that negative distortion becomes large. To solve this problem, for the lens system of the present invention, a positive lens having a large power is used as the first lens component $L_1$ so that the angle between the principal ray from the lens component $L_1$ and optical axis becomes large in order to correct negative distortion effectively. Besides, for the lens system of the present invention, negative lenses with large powers are used as the second lens component $L_2$ and third lens component $L_3$ in order to make the angle between the principal ray and optical axis small, thus the diameter of the front lens is made small and offaxial aberrations are corrected favourably over a wide field angle. When negative powers of these negative lenses $L_2$ and $L_3$ are larger, the front lens diameter can be made smaller. But, when said powers are too large, it becomes difficult to correct aberrations favourably. To solve the above problem, it is desirable to make the total focal length $f_{123}$ of the first, second and third lens components satisfy the condition (1). If this condition is not satisfied, that is, in case of $0.4f < |f_{123}|$, it is advantageous to make the lens system compact, but it is difficult to favourably correct aberrations, especially spherical aberration and astigmatism. Besides, in case of $|f_{123}| < 0.8f$, a wide field angle cannot be achieved and, as a result, the lens system cannot be made compact. Furthermore, in the lens system of the present invention, a thick positive lens is used as the fourth lens component $L_4$ in order to correct spherical aberration and astigmatism caused by the second lens component $L_2$ and third lens component $L_3$ which are negative lenses with large powers and, at the same time, to correct 123 distortion favourably. The fifth lens component $L_5$ takes an important role to correct aberrations such as spherical aberration, astigmatism, etc. when distances from the front surface to the rear surface of the fourth lens component $L_4$ and fifth lens component $L_5$ are respectively represented by $D_4$ and $D_5$, the fact to make their sum $D_4 + D_5$ as shown in the condition (2), i.e., $0.5f < D_4 + D_5 < f$, is effective especially for correction of aberrations. That is, in case of $0.5f > D_4 + D_5$, undercorrection occurs for aberrations on the meridional plane and sagittal plane. In case of $D_4 + D_5 > f$, on the contrary, overcorrection occurs for said aberrations. The above-mentioned fourth lens $L_4$ and fifth lens component $L_5$ may be both arranged by single lenses respectively. But, it is also possible to arrange said lenses by cemented lenses of combined lenses with a small airspace. When the fourth lens component $L_4$ is arranged by a cemented lens, chromatic aberration can be corrected more favourably. When said fourth lens component $L_4$ is divided into two lenses leaving a small airspace between those two lenses, i.e., said fourth lens component $L_4$ is arranged by a combined lens with a small airspace, it is effective to correct spherical aberration and, consequently, the aperture ratio can be made larger. By selecting a material with a small Abbe's number for the fifth lens component $L_5$, it is possible to favourably correct both longitudinal and lateral chromatic aberrations cooperating with selection of suitable materials for the first lens component $L_1$ and fourth lens component $L_4$. Finally, the sixth lens component $L_6$ is a positive meniscus lens with its concave surface positioned on the object side and is effective for correcting spherical aberration and coma favourably. Though said sixth lens component $L_6$ can be arranged by a single lens, the aperture ratio can be made still larger when this sixth lens is arranged as two lenses. In this case, both of those two lenses are arranged by positive meniscus lenses with their concave surfaces positioned on the object side. But, when the aperture ratio is made larger, the last lens shows a tendency to become a biconvex lens.

In the following, the above-mentioned retrofocus wide-angle lens system of the present invention is described in detail according to the illustrated embodiments.

BRIEF DESCRIPTION OF THE DRAWINGS

FIG. 8A, FIG. 8B, FIG. 8C, FIG. 9A, FIG. 9B, FIG. 9C, FIG. 10A, FIG. 10B, FIG. 10C, FIG. 11A, FIG. 11B, FIG. 11C, FIG. 12A, FIG. 12B, FIG. 12C, FIG. 13A, FIG. 13B, FIG. 13C, FIG. 14A, FIG. 14B, FIG. 14C, FIG. 15A, FIG. 15B, and FIG. 15C show graphs illustrating aberrations of respective embodiments of the lens system according to the present invention.

DETAILED DESCRIPTION OF THE PREFERRED EMBODIMENTS

Figure 1:
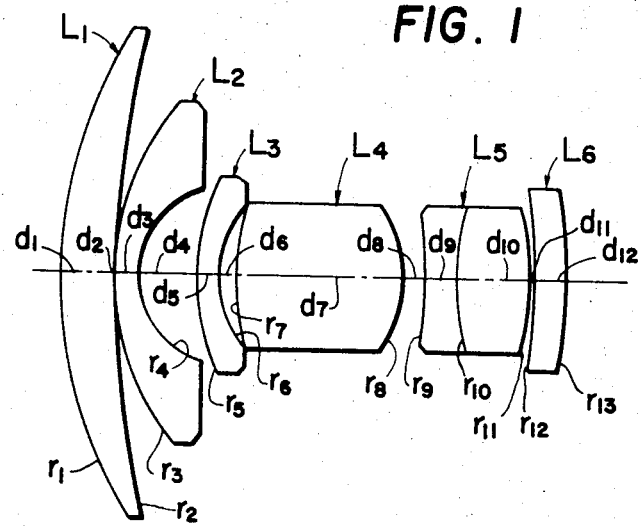
FIG. 1 through FIG. 7 show sectional views illustrating compositions of the respective embodiments of the lens system according to the present invention.

The embodiment 1 of the retrofocus wide-angle lens system according to the present invention is arranged as shown in FIG. 1. For this embodiment, a biconvex single lens is used as the fourth lens component $L_4$, a cemented negative meniscus doublet lens is used as the fifth lens component $L_5$ and a positive meniscus lens with its concave surface positioned on the object side is used as the sixth lens component $L_6$. Numerical data of said embodiment 1 are as give below.

Embodiment 1

$r_1 = 1.4862$
$\quad d_1 = 0.1861 \quad n_1 = 1.72 \quad \nu_1 = 42.1$
$r_2 = 3.6691$
$\quad d_2 = 0.0047$
$r_3 = 0.9039$
$\quad d_3 = 0.0698 \quad n_2 = 1.618 \quad \nu_2 = 63.4$
$r_4 = 0.3214$
$\quad d_4 = 0.2100$
$r_5 = 0.7290$
$\quad d_5 = 0.0698 \quad n_3 = 1.713 \quad \nu_3 = 54.0$
$r_6 = 0.3283$
$\quad d_6 = 0.0629$
$r_7 = 0.9365$
$\quad d_7 = 0.5915 \quad n_4 = 1.5955 \quad \nu_4 = 39.2$
$r_8 = -0.4401$
$\quad d_8 = 0.0745$
$r_9 = -1.3246$
$\quad d_9 = 0.0931 \quad n_5 = 1.8467 \quad \nu_5 = 23.9$
$r_{10} = 0.6474$
$\quad d_{10} = 0.2688 \quad n_6 = 1.6166 \quad \nu_6 = 36.6$
$r_{11} = -0.8825$
$\quad d_{11} = 0.093$
$r_{12} = -5.9585$
$\quad d_{12} = 0.1220 \quad n_7 = 1.6177 \quad \nu_7 = 49.8$
$r_{13} = -1.6938$
$f = 1.0$
$f_B = 1.6720$
$F\ 1 : 3.5$
$f_{123} = -0.487$
$D_1 = d_7$
$D_5 = d_9 + d_{10}$ where reference symbols $r_1$ through $r_{13}$ represent radii of curvature of successive lenses, reference symbols $d_1$ through $d_{12}$ represent thickness of successive lenses and distances between lenses on the axis, reference symbols $n_1$ through $n_{17}$ represent refractive indexes of successive lenses, $\nu_1$ through $\nu_7$ represent Abbe's number of successive lenses, reference symbol $f$ represents the total focal length of the whole lens system, reference symbol $f_B$ represents back focal length of the lens system and symbol $f_{123}$ represents the total focal length of the first, second and third lens component.

FIG. 8A, FIG. 8B, and FIG. 8C show aberrations (spherical aberration, sine condition, astigmatism and distortion) of the above-mentioned embodiment 1.

The embodiment 2 of the present invention is a lens system arranged also as shown in FIG. 1, i.e., in the same way as the embodiment 1, and has numerical data as given below. FIG. 9A, 9B and 9C show aberrations of the embodiment 2.

Embodiment 2

$r_1 = 1.5158$
$\quad d_1 = 0.1666 \quad n_1 = 1.72 \quad \nu_1 = 50.4$
$r_2 = 3.2855$
$\quad d_2 = 0.0042$
$r_3 = 0.7619$
$\quad d_3 = 0.0625 \quad n_2 = 1.6177 \quad \nu_2 = 55.1$
$r_4 = 0.3050$
$\quad d_4 = 0.1996$
$r_5 = 0.5045$
$\quad d_5 = 0.0625 \quad n_3 = 1.713 \quad \nu_3 = 54.0$
$r_6 = 0.3134$
$\quad d_6 = 0.1031$
$r_7 = 1.4944$
$\quad d_7 = 0.5071 \quad n_4 = 1.6990 \quad \nu_4 = 30.1$
$r_8 = -0.4433$
$\quad d_8 = 0.0667$
$r_9 = -0.7137$
$\quad d_9 = 0.0833 \quad n_5 = 1.8467 \quad \nu_5 = 23.9$
$r_{10} = 0.6291$
$\quad d_{10} = 0.2453 \quad n_6 = 1.6134 \quad \nu_6 = 43.8$
$r_{11} = -0.7196$
$\quad d_{11} = 0.0083$
$r_{12} = -2.8889$
$\quad d_{12} = 0.1099 \quad n_7 = 1.6134 \quad \nu_7 = 43.8$
$r_{13} = -1.0955$
$f = 1.0$
$f_B = 1.6128$
$F\ 1 : 3.5$
$f_{123} = -0.5964$
$D_1 = d_7$
$D_5 = d_9 + d_{10}$ where reference symbols $r_1$ through $r_{13}$ represent radii of curvature of successive lenses, reference symbols $d_1$ through $d_{12}$ represent thickness of successive lenses and distances between lenses on the axis, reference symbols $n_1$ through $n_7$ represent refractive indexes of successive lenses and $\nu_1$ through $\nu_7$ represent Abbe's number of successive lenses.

For the lens systems of the above-mentioned embodiment 1 and embodiment 2, the concave side of the surfaces $r_9$, $r_{11}$, $r_{12}$ and $r_{13}$ of the fifth lens component $L_5$ and sixth lens component $L_6$ are facing the stop which is provided between the fourth lens component $L_4$ and fifth lens component $L_5$ in order to favourably correct distortion which is a weak point of ultra-wide-lens systems.

Figure 2:
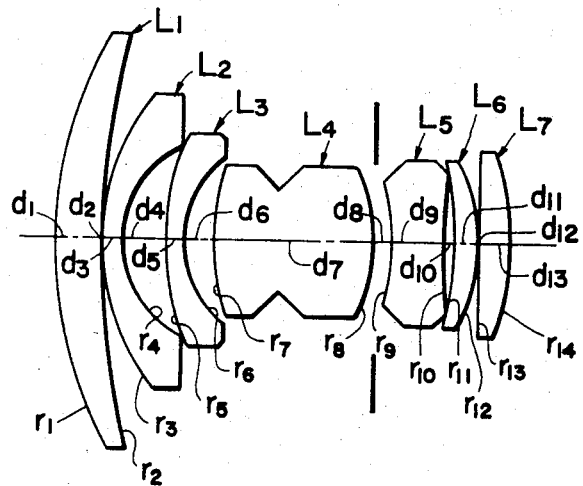
Figures 10A, 10B, 10C:
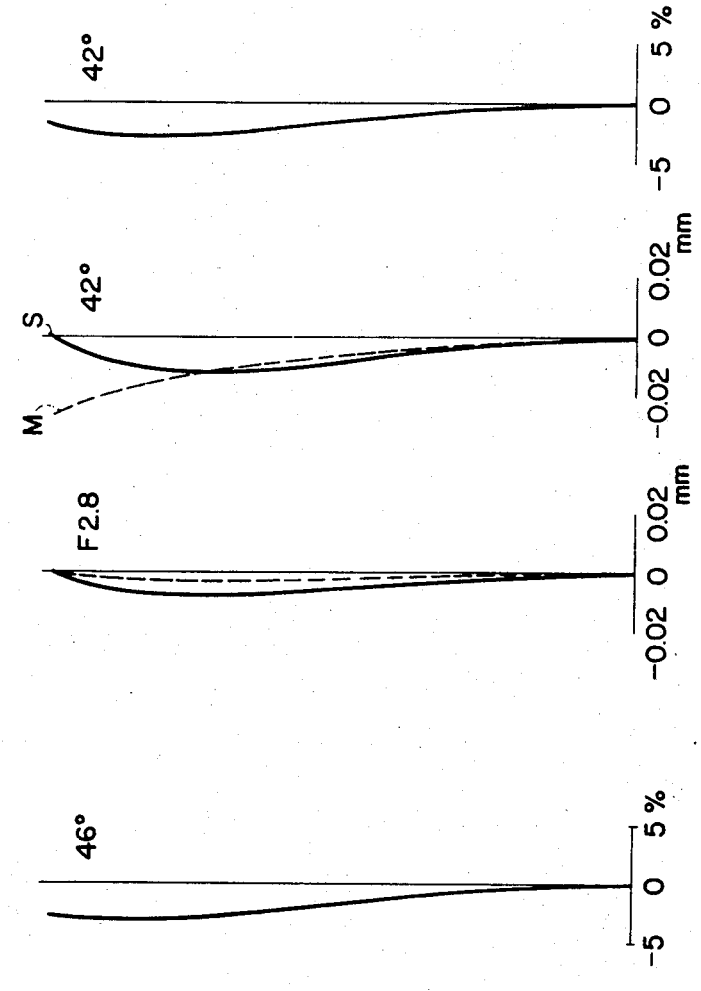

The embodiment 3 of the present invention is a lens system as shown in FIG. 2. In this embodiment 3, a biconvex single lens is used as the fourth lens component $L_4$ and a biconcave single lens is used as the fifth lens component $L_5$. Besides, instead of the sixth lens component $L_6$ of the embodiments 1 and 2, two positive meniscus lenses, the sixth lens component $L_6$ and seventh lens component $L_7$, are used. Numerical data of the embodiment 3 are as given below and its aberrations are shown in FIG. 10A, FIG. 10B and FIG. 10C.

Embodiment 3

$r_1 = 1.6253$
$\quad d_1 = 0.1858 \quad n_1 = 1.72 \quad \nu_1 = 42.1$
$r_2 = 3.2365$
$\quad d_2 = 0.0046$
$r_3 = 0.9343$
$\quad d_3 = 0.0697 \quad n_2 = 1.618 \quad \nu_2 = 63.4$
$r_4 = 0.4107$
$\quad d_4 = 0.1802$
$r_5 = 1.0250$
$\quad d_5 = 0.0697 \quad n_3 = 1.713 \quad \nu_3 = 54.0$
$r_6 = 0.4124$
$\quad d_6 = 0.1263$
$r_7 = 1.1107$
$\quad d_7 = 0.6153 \quad n_4 = 1.5955 \quad \nu_4 = 39.2$

Embodiment 3-Continued $r_8 = -0.7086$
$d_8 = 0.0743$
$r_9 = -1.1192$
$d_9 = 0.2164$  $n_5 = 1.8467$  $\nu_5 = 23.9$
$r_{10} = 3.8385$
$d_{10} = 0.0302$
$r_{11} = -2.0152$
$d_{11} = 0.0929$  $n_6 = 1.618$  $\nu_6 = 63.4$
$r_{12} = -0.6649$
$d_{12} = 0.0070$
$r_{13} = -11.8690$
$d_{13} = 0.1254$  $n_7 = 1.618$  $\nu_7 = 63.4$
$r_{14} = -0.9824$
$f = 1.0$
$f_B = 1.7335$
$F 1 : 3.5$
$f_{123} = -0.648$
$D_1 = d_7$
$D_2 = d_9$ where reference symbols $r_1$ through $r_{14}$ represent radii of curvature of successive lenses, reference symbols $d_1$ through $d_{13}$ represent thickness of successive lenses and distances between lenses on the axis, reference symbols $n_1$ through $n_7$ represent refractive indexes of successive lenses and $\nu_1$ through $\nu_7$ represent Abbe's number of successive lenses.

Seidel's aberration coefficients of the above-mentioned embodiment 3 are as given in the table below.

|    | B        | F       | C       | P       | E       |
|----|----------|---------|---------|---------|---------|
| 1  | 0.0567   | 0.0455  | 0.0508  | 0.2575  | 0.2716  |
| 2  | 0.0003   | 0.0793  | 0.0049  | −0.1293 | −0.8027 |
| 3  | 0.0574   | 0.0302  | 0.0416  | 0.4088  | 0.3186  |
| 4  | −5.7963  | −0.1523 | 0.9397  | −0.9301 | 0.1755  |
| 5  | 1.3064   | 0.1157  | 0.3889  | 0.4061  | 0.1553  |
| 6  | −25.2397 | −0.1335 | 1.8358  | −1.0092 | 0.0831  |
| 7  | 9.7245   | 0.0985  | 0.9788  | 0.3360  | 0.0437  |
| 8  | 7.6224   | 0.5236  | −1.9979 | 0.5267  | −0.2753 |
| 9  | −2.8301  | −0.3599 | 1.0093  | −0.4096 | 0.2744  |
| 10 | −3.2733  | −0.7575 | −1.5747 | −0.1194 | −0.4219 |
| 11 | 0.0688   | 0.3243  | 0.1494  | −0.1895 | 0.2926  |
| 12 | 7.1253   | 0.1041  | −0.8612 | 0.5744  | −0.0820 |
| 13 | −0.0012  | −0.0187 | 0.0048  | −0.0322 | 0.1980  |
| 14 | 13.7050  | 0.0837  | −1.0713 | 0.3888  | −0.0369 |
| Σ  | 2.5262   | −0.0169 | 0.1010  | 0.0789  | 0.1939  |

In the above table, reference symbol B represents spherical aberration, reference symbol F represents coma, reference symbol C represents astigmatism, reference symbol P represents curvature of field and reference symbol E represents distortion.

Figure 3:
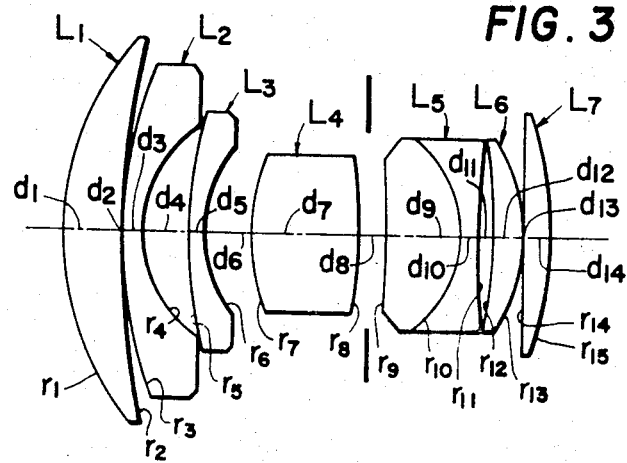
Figures 11A, 11B, 11C:
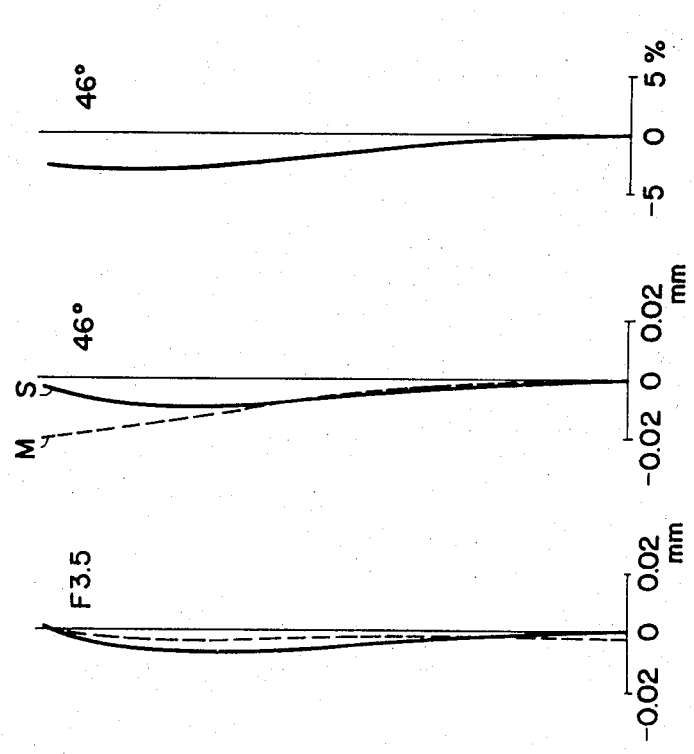

The embodiment 4 of the present invention is a lens system as shown in FIG. 3 and its fourth lens component $L_4$ is a biconvex single lens, fifth lens component $L_5$ is a cemented biconcave doublet lens, and sixth lens component $L_6$ and seventh lens component $L_7$ are both positive meniscus lenses. Numerical data of the embodiment 4 are as given below and FIG. 11A, FIG. 11B, and FIG. 11c show aberrations of the embodiment 4.

Embodiment 4

$r_1 = 0.9929$
$d_1 = 0.2032$  $n_1 = 1.7234$  $\nu_1 = 38.0$
$r_2 = 2.9465$
$d_2 = 0.0041$
$r_3 = 1.7084$
$d_3 = 0.0610$  $n_2 = 1.6228$  $\nu_2 = 57.1$
$r_4 = 0.4157$
$d_4 = 0.1557$
$r_5 = 1.3437$
$d_5 = 0.0610$  $n_3 = 1.713$  $\nu_3 = 54.0$
$r_6 = 0.4614$
$d_6 = 0.1642$
$r_7 = 0.8417$
$d_7 = 0.3711$  $n_4 = 1.6141$  $\nu_4 = 55.0$
$r_8 = -1.8323$
$d_8 = 0.1028$
$r_9 = -4.5279$
$d_9 = 0.2536$  $n_5 = 1.7618$  $\nu_5 = 27.1$
$r_{10} = -0.4098$
$d_{10} = 0.0549$  $n_6 = 1.8052$  $\nu_6 = 25.4$
$r_{11} = 2.3780$
$d_{11} = 0.0500$
$r_{12} = -2.3062$
$d_{12} = 0.1016$  $n_7 = 1.618$  $\nu_7 = 63.4$
$r_{13} = -0.6202$
$d_{13} = 0.0061$
$r_{14} = 39.7139$
$d_{14} = 0.0976$  $n_8 = 1.618$  $\nu_8 = 63.4$
$r_{15} = -1.1628$
$f = 1.0$
$f_B = 1.5318$
$F 1 : 2.8$
$f_{123} = -0.689$
$D_1 = d_7$
$D_2 = d_9 + d_{10}$ where reference symbols $r_1$ through $r_{15}$ represent radii of curvature of successive lenses, reference symbols $d_1$ through $d_{14}$ represent thickness of successive lenses and distances between lenses on the axis, reference symbols $n_1$ through $n_8$ represent refractive indexes of successive lenses and $\nu_1$ through $\nu_8$ represent Abbe's number of successive lenses.

Seidel's aberration coefficients of the above-mentioned embodiment 4 are as given in the table below.

|    | B        | F       | C       | P       | E       |
|----|----------|---------|---------|---------|---------|
| 1  | 0.2488   | 0.0204  | 0.0713  | 0.4227  | 0.1271  |
| 2  | 0.0089   | 0.3441  | −0.0553 | −0.1425 | −1.2539 |
| 3  | −0.0001  | −0.1082 | −0.0055 | 0.2246  | 0.9628  |
| 4  | −4.7694  | −0.0378 | 0.4245  | −0.9233 | 0.0855  |
| 5  | 0.6692   | 0.1920  | 0.3584  | 0.3098  | 0.2688  |
| 6  | −17.2745 | −0.0003 | 0.0715  | −0.9021 | 0.0037  |
| 7  | 12.0612  | 0.2188  | 1.6244  | 0.4520  | 0.0903  |
| 8  | 0.0398   | 0.0667  | −0.0515 | 0.2076  | −0.3550 |
| 9  | 0.0007   | 0.0143  | −0.0031 | −0.0955 | 0.3747  |
| 10 | −1.7510  | −0.0000 | 0.0086  | −0.0333 | 0.0002  |
| 11 | −2.9099  | −1.0067 | −1.7115 | −0.1876 | −0.7024 |
| 12 | 0.0840   | 0.3708  | 0.1765  | −0.1656 | 0.4312  |
| 13 | 7.4630   | 0.0216  | −0.4017 | 0.6158  | −0.0343 |
| 14 | −0.0021  | −0.0547 | 0.0108  | 0.0096  | 0.2286  |
| 15 | 7.6414   | 0.0305  | −0.4828 | 0.3285  | −0.0227 |
| Σ  | 1.5098   | −0.0183 | 0.0347  | 0.1209  | 0.2045  |

Figure 4:
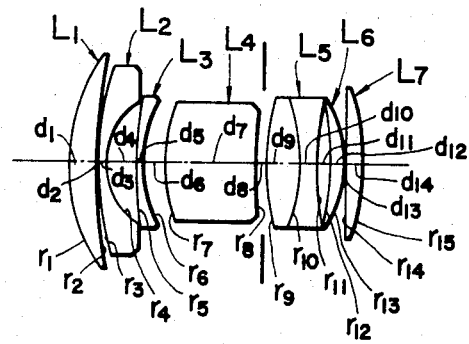

The embodiment 5 of the present invention is a lens system as shown in FIG. 4 and its fourth lens component $L_4$ is a positive meniscus lens, fifth lens component $L_5$ is a cemented negative meniscus doublet lens, and sixth lens component $L_6$ and seventh lens component $L_7$ are both positive meniscus lenses. Numerical data of the embodiment 5 are as given below and FIG. 12A, FIG. 12B and FIG. 12C show aberrations of the embodiment 5.

Embodiment 5

$r_1 = 0.8343$
$d_1 = 0.1292$    $n_1 = 1.72$    $\nu_1 = 50.4$
$r_2 = 2.5745$
$d_2 = 0.0039$
$r_3 = 1.4787$
$d_3 = 0.0388$    $n_2 = 1.618$   $\nu_2 = 63.4$
$r_4 = 0.3284$
$d_4 = 0.1309$
$r_5 = 1.4978$
$d_5 = 0.0388$    $n_3 = 1.6485$  $\nu_3 = 53.0$
$r_6 = 0.5737$
$d_6 = 0.1037$
$r_7 = 0.7825$
$d_7 = 0.4295$    $n_4 = 1.6261$  $\nu_4 = 39.1$
$r_8 = 3.8596$
$d_8 = 0.0517$
$r_9 = 1.8316$
$d_9 = 0.1570$    $n_5 = 1.762$   $\nu_5 = 40.2$
$r_{10} = -0.8117$
$d_{10} = 0.0858$ $n_6 = 1.8052$  $\nu_6 = 25.4$
$r_{11} = 1.6849$
$d_{11} = 0.0473$
$r_{12} = -1.5176$
$d_{12} = 0.0737$ $n_7 = 1.6968$  $\nu_7 = 55.6$
$r_{13} = -0.5620$
$d_{13} = 0.0039$
$r_{14} = -18.9612$
$d_{14} = 0.0753$ $n_8 = 1.734$   $\nu_8 = 51.5$
$r_{15} = -1.3937$
$f = 1.0$
$f_B = 1.4473$
$f_{123} = -0.701$
$D_4 = d_7$
$D_5 = d_9 + d_{10}$ where reference symbols $r_1$ through $r_{15}$ represent radii of curvature of successive lens, reference symbols $d_1$ through $d_{14}$ represent thickness of successive lenses and distances between lenses on the axis, reference symbols $n_1$ through $n_8$ represent refractive indexes of successive lenses and $\nu_1$ through $\nu_8$ represent Abbe's number of successive lenses.

Seidel's aberration coefficients of the abovementioned embodiment 5 are as given in the table below.

|    | B        | F       | C       | P       | E       |
|----|----------|---------|---------|---------|---------|
| 1  | 0.4191   | 0.0332  | 0.1179  | 0.5018  | 0.1505  |
| 2  | 0.0164   | 0.4047  | -0.0816 | -0.1626 | -1.2010 |
| 3  | -0.0002  | -0.2328 | -0.0065 | 0.2583  | 0.9205  |
| 4  | -12.1441 | -0.1884 | 1.5126  | -1.1631 | 0.1683  |
| 5  | 1.1900   | 0.2110  | 0.5010  | 0.2626  | 0.1994  |
| 6  | -13.5588 | -0.0190 | -0.5080 | -0.6857 | -0.0264 |
| 7  | 12.1022  | 0.1535  | 1.3628  | 0.4920  | 0.0727  |
| 8  | -0.7313  | -0.3950 | -0.5375 | -0.0998 | -0.3636 |
| 9  | 1.7969   | 0.5400  | 0.9850  | 0.2361  | 0.4254  |
| 10 | -0.1980  | -0.0078 | 0.0393  | 0.0167  | 0.0049  |
| 11 | -3.0588  | -0.8919 | -1.6517 | -0.2647 | -0.6245 |
| 12 | 0.0009   | 0.2467  | -0.0149 | -0.2706 | 0.3952  |
| 13 | 9.9922   | 0.0844  | -0.9183 | 0.7307  | -0.0749 |
| 14 | -0.0432  | -0.1250 | 0.0735  | -0.0223 | 0.2507  |
| 15 | 5.5384   | 0.1624  | -0.9483 | 0.3037  | -0.0798 |
| Σ  | 1.3217   | -0.0241 | -0.0746 | 0.0997  | 0.2174  |

Figure 5:
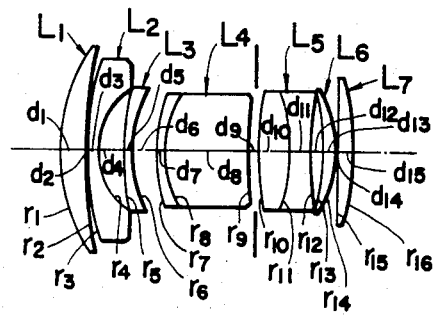

The embodiment 6 of the present invention is a lens system as shown in FIG. 5 and its fourth lens component $L_4$ is a cemented positive meniscus doublet lens, fifth lens component $L_5$ is a cemented negative meniscus doublet lens, and sixth lens component $L_6$ and seventh lens component $L_7$ are both positive meniscus lenses. Numerical data of the embodiment 6 are as given below and FIG. 13A, FIG. 13B and FIG. 13C show aberrations of the embodiment 6.

Embodiment 6

$r_1 = 0.8404$
$d_1 = 0.1292$    $n_1 = 1.72$    $\nu_1 = 50.4$
$r_2 = 2.5703$
$d_2 = 0.0038$
$r_3 = 1.4611$
$d_3 = 0.0388$    $n_2 = 1.618$   $\nu_2 = 63.4$
$r_4 = 0.3275$
$d_4 = 0.1308$
$r_5 = 1.5280$
$d_5 = 0.0388$    $n_3 = 1.6485$  $\nu_3 = 53.0$
$r_6 = 0.5965$
$d_6 = 0.1168$
$r_7 = 0.7924$
$d_7 = 0.0396$    $n_4 = 1.6676$  $\nu_4 = 41.9$
$r_8 = 0.5388$
$d_8 = 0.3785$    $n_5 = 1.6261$  $\nu_5 = 39.1$
$r_9 = 3.1889$
$d_9 = 0.0517$
$r_{10} = 1.5540$
$d_{10} = 0.1498$ $n_6 = 1.762$   $\nu_6 = 40.2$
$r_{11} = -0.8097$
$d_{11} = 0.0932$ $n_7 = 1.8052$  $\nu_7 = 25.4$
$r_{12} = 1.5325$
$d_{12} = 0.0473$
$r_{13} = -1.5070$
$d_{13} = 0.0737$ $n_8 = 1.6968$  $\nu_8 = 55.6$
$r_{14} = -0.5633$
$d_{14} = 0.0038$
$r_{15} = -38.4579$
$d_{15} = 0.0753$ $n_9 = 1.734$   $\nu_9 = 51.5$
$r_{16} = -1.4308$
$f = 1.0$
$f_B = 1.4549$
$f_{123} = -0.714$
$D_4 = d_7 + d_8$
$D_5 = d_{10} + d_{11}$ where reference symbols $r_1$ through $r_{16}$ represent radii of curvature of successive lenses, reference symbols $d_1$ through $d_{15}$ represent thickness of successive lenses and distances between lenses on the axis, reference symbols $n_1$ through $n_9$ represent refractive indexes of successive lenses and $\nu_1$ through $\nu_9$ represent Abbe's number of successive lenses.

Figure 6:
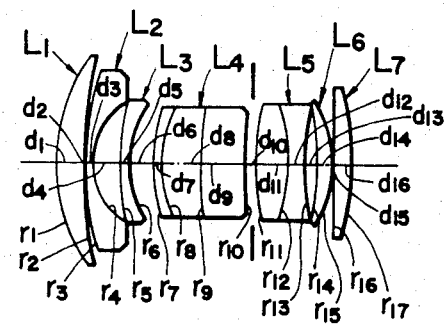

The embodiment 7 of the present invention is a lens system as shown in FIG. 6 and its fourth lens component $L_4$ is a cemented triplet positive meniscus lens, fifth lens component $L_5$ is a cemented negative meniscus doublet lens, and sixth lens component $L_6$ and seventh lens component $L_7$ are both positive meniscus lenses. Numerical data of the embodiment 7 are as given below and FIG. 14A, FIG. 14B and FIG. 14C show aberrations of the embodiment 7.

Embodiment 7

| | | | |
|---|---|---|---|
| $r_1 = 0.8299$ | | | |
| | $d_1 = 0.1290$ | $n_1 = 1.72$ | $\nu_1 = 50.4$ |
| $r_2 = 2.5764$ | | | |
| | $d_2 = 0.0038$ | | |
| $r_3 = 1.4996$ | | | |
| | $d_3 = 0.0387$ | $n_2 = 1.618$ | $\nu_2 = 63.4$ |
| $r_4 = 0.3282$ | | | |
| | $d_4 = 0.1307$ | | |
| $r_5 = 1.5117$ | | | |
| | $d_5 = 0.0387$ | $n_3 = 1.6485$ | $\nu_3 = 53.0$ |
| $r_6 = 0.5629$ | | | |
| | $d_6 = 0.1079$ | | |
| $r_7 = 0.7628$ | | | |
| | $d_7 = 0.0395$ | $n_4 = 1.6676$ | $\nu_4 = 41.9$ |
| $r_8 = 0.5353$ | | | |
| | $d_8 = 0.1845$ | $n_5 = 1.6261$ | $\nu_5 = 39.1$ |
| $r_9 = 2.1167$ | | | |
| | $d_9 = 0.2064$ | $n_6 = 1.6237$ | $\nu_6 = 46.9$ |
| $r_{10} = 3.8690$ | | | |
| | $d_{10} = 0.0516$ | | |
| $r_{11} = 1.6059$ | | | |
| | $d_{11} = 0.1570$ | $n_7 = 1.762$ | $\nu_7 = 40.2$ |
| $r_{12} = -0.8091$ | | | |
| | $d_{12} = 0.0823$ | $n_8 = 1.8052$ | $\nu_8 = 25.4$ |
| $r_{13} = 1.5350$ | | | |
| | $d_{13} = 0.0472$ | | |
| $r_{14} = -1.4575$ | | | |
| | $d_{14} = 0.0736$ | $n_9 = 1.6968$ | $\nu_9 = 55.6$ |
| $r_{15} = -0.5545$ | | | |
| | $d_{15} = 0.0038$ | | |
| $r_{16} = -121.6048$ | | | |
| | $d_{16} = 0.0752$ | $n_{10} = 1.734$ | $\nu_{10} = 51.5$ |
| $r_{17} = -1.4855$ | | | |

$f = 1.0$
$f_R = 1.4536$
$f_{123} = -0.688$
$D_4 = d_7 + d_8 + d_9$
$D_5 = d_{11} + d_{12}$ where reference symbols $r_1$ through $r_{17}$ represent radii of curvature of successive lenses, reference symbols $d_1$ through $d_{16}$ represent thickness of successive lenses and distances between lenses on the axis, reference symbols $n_1$ through $n_{10}$ represent refractive indexes of successive lenses and $\nu_1$ through $\nu_{10}$ represent Abbe's number of successive lenses.

Figure 7:
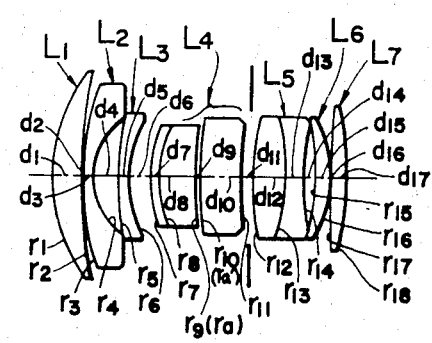

The embodiment 8 of the present invention is a lens system as shown in FIG. 7. The fourth lens component $L_4$ of this embodiment is a combined lens comprising a cemented positive meniscus doublet lens and a positive meniscus lens arranged leaving a small airspace between each other. The fifth lens component $L_5$ is a cemented negative meniscus doublet lens. The sixth lens component $L_6$ and seventh lens component $L_7$ are both positive lenses. Numerical data of the embodiment 8 are as given below and FIG. 15A, FIG. 15B and FIG. 15C show aberrations of the embodiment 8.

Embodiment 8

| | | | |
|---|---|---|---|
| $r_1 = 0.8352$ | | | |
| | $d_1 = 0.1290$ | $n_1 = 1.72$ | $\nu_1 = 50.4$ |
| $r_2 = 2.5729$ | | | |
| | $d_2 = 0.0038$ | | |
| $r_3 = 1.5009$ | | | |
| | $d_3 = 0.0387$ | $n_2 = 1.618$ | $\nu_2 = 63.4$ |
| $r_4 = 0.3300$ | | | |
| | $d_4 = 0.1306$ | | |
| $r_5 = 1.5990$ | | | |
| | $d_5 = 0.0387$ | $n_3 = 1.6485$ | $\nu_3 = 53.0$ |
| $r_6 = 0.5789$ | | | |
| | $d_6 = 0.1095$ | | |
| $r_7 = 0.7756$ | | | |
| | $d_7 = 0.0395$ | $n_4 = 1.6676$ | $\nu_4 = 41.9$ |

Embodiment 8 — Continued

| | | | |
|---|---|---|---|
| $r_8 = 0.5351$ | | | |
| | $d_8 = 0.1753$ | $n_5 = 1.6261$ | $\nu_5 = 39.1$ |
| $r_9 = 1.9263$ | | | |
| | $d_9 = 0.0082$ | | |
| $r_{10} = 1.7459$ | | | |
| | $d_{10} = 0.2058$ | $n_6 = 1.6237$ | $\nu_6 = 46.9$ |
| $r_{11} = 3.6218$ | | | |
| | $d_{11} = 0.0516$ | | |
| $r_{12} = 1.5649$ | | | |
| | $d_{12} = 0.1569$ | $n_7 = 1.762$ | $\nu_7 = 40.2$ |
| $r_{13} = -0.8088$ | | | |
| | $d_{13} = 0.0889$ | $n_8 = 1.8052$ | $\nu_8 = 25.4$ |
| $r_{14} = 1.4895$ | | | |
| | $d_{14} = 0.0472$ | | |
| $r_{15} = -1.3814$ | | | |
| | $d_{15} = 0.0735$ | $n_9 = 1.6968$ | $\nu_9 = 55.6$ |
| $r_{16} = -0.5552$ | | | |
| | $d_{16} = 0.0038$ | | |
| $r_{17} = 28.8360$ | | | |
| | $d_{17} = 0.0752$ | $n_{10} = 1.734$ | $\nu_{10} = 51.5$ |
| $r_{18} = -1.5345$ | | | |

$f = 1.0$
$f_R = 1.4480$
$f_{123} = -0.693$
$D_4 = d_7 + d_8 + d_{10}$
$D_5 = d_{12} + d_{13}$ where reference symbols $r_1$ through $r_{18}$ represent radii of curvature of successive lenses, reference symbols $d_1$ through $d_{17}$ represent thickness of successive lenses and distances between lenses on the axis, reference symbols $n_1$ through $n_{10}$ represent refractive indexes of successive lenses and $\nu_1$ through $\nu_{10}$ represent Abbe's number of successive lenses.

When using a divided lens as the fourth lens component $L_4$ as in the case of the above-mentioned embodiment 8, it is effective for correction of offaxial aberrations to make the power caused at the airspace small. For this purpose it is desirable to select radii of curvatures of surfaces in front and rear of said airspace to satisfy the formula $0.5 < r_a/r_{a'} < 2$ when reference symbols $r_a$ and $r_{a'}$ (i.e., reference symbols $r_9$ and $r_{10}$ for the embodiment 8) respectively represent said radii of curvatures. If said radii of curvatures are not in the above-mentioned range, it is unfavourable especially for correcting coma. Besides, when using a cemented doublet lens as the fifth lens $L_5$ as in cases of the embodiments 4, 5, 6, 7 and 8, it is desirable to make arrangements as follows. That is, when the cemented surface of said cemented lens is represented by reference symbol $r_b$, it is desirable to arrange said cemented surface $r_b$ so that the concave surface is positioned on the stop side provided between the fourth lens component $L_4$ and fifth lens component $L_5$, i.e., so that it becomes $r_6 < 0$. Besides, when reference symbols $n_b$ and $n_{b'}$ respectively represent refractive indexes of the front and rear lenses of said cemented doublet lens, it is desirable to arrange so that the relation of said refractive indexes becomes $n_{b'} - n_b < 0.1$. These arrangements are effective especially for favourably correcting sagittal coma aberration.

I claim:

1. A retrofocus wide-angle lens system consisting of a first lens component being a positive meniscus lens, a second lens component being a negative meniscus lens, a third lens component being a negative meniscus lens, a fourth lens component means having a positive refractive power, a fifth lens component means having a negative refractive power, a sixth lens component being a positive lens, and said retrofocus wide-angle lens system satisfying the following conditions:

$0.4f < |f_{123}| < 0.8f, f_{123} < 0$
$0.5f < D_4 + D_5 < f$ where reference symbol $f$ represents the total focal length of the lens system as a whole, reference symbol $f_{123}$ represents the total focal length of said first, second and third lens components, reference symbol $D_4$ represents the distance from the front surface to the rear surface of said fourth lens component means and reference symbol $D_5$ represents the distance from the front surface to rear surface of said fifth lens component means.

2. A retrofocus wide-angle lens system comprising a first lens component being a positive meniscus lens, a second lens component being a negative meniscus lens, a third lens component being a negative meniscus lens, a fourth lens component being a positive lens, a fifth lens component being a cemented negative doublet lens, a sixth lens component being a positive single lens, and said retrofocus wide-angle lens system having the following numerical data:

$r_1 = 1.4862$
$\quad d_1 = 0.1861 \quad n_1 = 1.72 \quad \nu_1 = 42.1$
$r_2 = 3.6691$
$\quad d_2 = 0.0047$
$r_3 = 0.9039$
$\quad d_3 = 0.0698 \quad n_2 = 1.618 \quad \nu_2 = 63.4$
$r_4 = 0.3214$
$\quad d_4 = 0.2100$
$r_5 = 0.7290$
$\quad d_5 = 0.0698 \quad n_3 = 1.713 \quad \nu_3 = 54.0$
$r_6 = 0.3283$
$\quad d_6 = 0.0629$
$r_7 = 0.9365$
$\quad d_7 = 0.5915 \quad n_4 = 1.5955 \quad \nu_4 = 39.2$
$r_8 = -0.4401$
$\quad d_8 = 0.0745$
$r_9 = -1.3246$
$\quad d_9 = 0.0931 \quad n_5 = 1.8467 \quad \nu_5 = 23.9$
$r_{10} = 0.6474$
$\quad d_{10} = 0.2688 \quad n_6 = 1.6166 \quad \nu_6 = 36.6$
$r_{11} = -0.8825$
$\quad d_{11} = 0.093$
$r_{12} = -5.9585$
$\quad d_{12} = 0.1220 \quad n_7 = 1.6177 \quad \nu_7 = 49.8$
$r_{13} = -1.6938$
$f = 1.0$
$f_B = 1.6720$
$F\ 1:3.5$
$f_{123} = -0.487$
$D_4 = d_7$
$D_5 = d_9 + d_{10}$ where reference symbols $r_1$ through $r_{13}$ represent radii of curvature of successive lenses, reference symbols $d_1$ through $d_{12}$ represent thickness of successive lenses and distances between lenses on the axis, reference symbols $n_1$ through $n_7$ represent refractive indexes of successive lenses, $\nu_1$ through $\nu_7$ represent Abbe's number of successive lenses, reference symbol $f$ represents the total focal length of the whole lens system, reference symbol $f_B$ represents back focal length of the lens system and symbol $f_{123}$ represents the total focal length of the first, second and third lens components.

3. A retrofocus wide-angle lens system comprising a first lens component being a positive meniscus lens, a second lens component being a negative meniscus lens, a third lens component being a negative meniscus lens, a fourth lens component being a positive lens, a fifth lens component being a cemented negative doublet lens, a sixth lens component being a positive single lens, and said retrofocus wide-angle lens system having the following numerical data:

$r_1 = 1.5158$
$\quad d_1 = 0.1666 \quad n_1 = 1.72 \quad \nu_1 = 50.4$
$r_2 = 3.2855$
$\quad d_2 = 0.0042$ —Continued $r_3 = 0.7619$
$\quad d_3 = 0.0625 \quad n_2 = 1.6177 \quad \nu_2 = 55.1$
$r_4 = 0.3050$
$\quad d_4 = 0.1996$
$r_5 = 0.5045$
$\quad d_5 = 0.0625 \quad n_3 = 1.713 \quad \nu_3 = 54.0$
$r_6 = 0.3134$
$\quad d_6 = 0.1031$
$r_7 = 1.4944$
$\quad d_7 = 0.5071 \quad n_4 = 1.6990 \quad \nu_4 = 30.1$
$r_8 = -0.4433$
$\quad d_8 = 0.0667$
$r_9 = -0.7137$
$\quad d_9 = 0.0833 \quad n_5 = 1.8467 \quad \nu_5 = 23.9$
$r_{10} = 0.6291$
$\quad d_{10} = 0.2453 \quad n_6 = 1.6134 \quad \nu_6 = 43.8$
$r_{11} = -0.7196$
$\quad d_{11} = 0.0083$
$r_{12} = -2.8889$
$\quad d_{12} = 0.1099 \quad n_7 = 1.6134 \quad \nu_7 = 43.8$
$r_{13} = -1.0955$
$f = 1.0$
$f_B = 1.6128$
$F\ 1:3.5$
$f_{123} = -0.5964$
$D_4 = d_7$
$D_5 = d_9 + d_{10}$ where reference symbols $r_1$ through $r_{13}$ represent radii of curvature of successive lenses, reference symbols $d_1$ through $d_{12}$ represent thickness of successive lenses and distances between lenses on the axis, reference symbols $n_1$ through $n_7$ represent refractive indexes of successive lenses, $\nu_1$ through $\nu_7$ represent Abbe's number of successive lenses, reference symbol $f$ represents the total focal length of the whole lens system, reference symbol $f_B$ represents back focal length of the lens system and symbol $f_{123}$ represents the total focal length of the first, second and third lens components.

4. A retrofocus wide-angle lens system comprising a first lens component being a positive meniscus lens, a second lens component being a negative meniscus lens, a third lens component being a negative meniscus lens, a fourth lens component being a positive lens, a fifth lens component being a negative lens, and sixth and seventh lens components being positive lenses, and said retrofocus wide-angle lens system having the following numerical data:

$r_1 = 1.6253$
$\quad d_1 = 0.1858 \quad n_1 = 1.72 \quad \nu_1 = 42.1$
$r_2 = 3.2365$
$\quad d_2 = 0.0046$
$r_3 = 0.9343$
$\quad d_3 = 0.0697 \quad n_2 = 1.618 \quad \nu_2 = 63.4$
$r_4 = 0.4107$
$\quad d_4 = 0.1802$
$r_5 = 1.0250$
$\quad d_5 = 0.0697 \quad n_3 = 1.713 \quad \nu_3 = 54.0$
$r_6 = 0.4124$
$\quad d_6 = 0.1263$
$r_7 = 1.1107$
$\quad d_7 = 0.6183 \quad n_4 = 1.5955 \quad \nu_4 = 39.2$
$r_8 = -0.7086$
$\quad d_8 = 0.0743$
$r_9 = -1.1192$
$\quad d_9 = 0.2164 \quad n_5 = 1.8467 \quad \nu_5 = 23.9$
$r_{10} = 3.8385$
$\quad d_{10} = 0.0302$
$r_{11} = -2.0152$
$\quad d_{11} = 0.0929 \quad n_6 = 1.618 \quad \nu_6 = 63.4$
$r_{12} = -0.6649$
$\quad d_{12} = 0.0070$
$r_{13} = -11.8690$
$\quad d_{13} = 0.1254 \quad n_7 = 1.618 \quad \nu_7 = 63.4$
$r_{14} = -0.9824$
$f = 1.0$
$f_B = 1.7335$
$F\ 1:3.5$
$f_{123} = -0.648$
$D_4 = d_7$
$D_5 = d_9$ where reference sumbols $r_1$ through $r_{14}$ represent radii of curvature of successive lenses, reference symbols $d_1$ through $d_{13}$ represent thickness of successive lenses and distances between lenses on the axis, reference symbols $n_1$ through $n_7$ represent refractive indexes of successive lenses, $\nu_1$ through $\nu_7$ represent Abbe's number of successive lenses, reference symbol $f$ represents the total focal length of the whole lens system, reference symbol $f_B$ represents back focal length of the lens system and symbol $f_{123}$ represents the total focal length of the first, second and third lens components.

5. A retrofocus wide-angle lens system comprising a first lens component being a positive meniscus lens, a second lens component being a negative meniscus lens, a third lens component being a negative meniscus lens, a fourth lens component being a positive lens, a fifth lens component being a cemented negative doublet lens, and sixth and seventh lens components being positive lenses, and said retrofocus wide-angle lens system having the following numerical data:

$r_1 = 0.9929$
$d_1 = 0.2032$  $n_1 = 1.7234$  $\nu_1 = 38.0$
$r_2 = 2.9465$
$d_2 = 0.0041$
$r_3 = 1.7084$
$d_3 = 0.0610$  $n_2 = 1.6228$  $\nu_2 = 57.1$
$r_4 = 0.4157$
$d_4 = 0.1557$
$r_5 = 1.3437$
$d_5 = 0.0610$  $n_3 = 1.713$  $\nu_3 = 54.0$
$r_6 = 0.4614$
$d_6 = 0.1642$
$r_7 = 0.8417$
$d_7 = 0.3711$  $n_4 = 1.6141$  $\nu_4 = 55.0$
$r_8 = -1.8323$
$d_8 = 0.1028$
$r_9 = -4.5279$
$d_9 = 0.2536$  $n_5 = 1.7618$  $\nu_5 = 27.1$
$r_{10} = -0.4098$
$d_{10} = 0.0549$  $n_6 = 1.8052$  $\nu_6 = 25.4$
$r_{11} = 2.3780$
$d_{11} = 0.0500$
$r_{12} = -2.3062$
$d_{12} = 0.1016$  $n_7 = 1.618$  $\nu_7 = 63.4$
$r_{13} = -0.6202$
$d_{13} = 0.0061$
$r_{14} = 39.7139$
$d_{14} = 0.0976$  $n_8\ 1.618$  $\nu_8 = 63.4$
$r_{15} = -1.1628$
$f = 1.0$
$f_B = 1.5318$
$F\ 1:2.8$
$f_{123} = -0.689$
$D_4 = d_7$
$D_5 = d_9 + d_{10}$ where reference symbols $r_1$ through $r_{15}$ represent radii of curvature of successive lenses, reference symbols $d_1$ through $d_{14}$ represent thickness of successive lenses and distances between lenses on the axis, reference symbols $n_1$ through $n_8$ represent refractive indexes of successive lenses, $\nu_1$ through $\nu_8$ represent Abbe's number of successive lenses, reference symbol $f$ represents the total focal length of the whole lens system, reference symbol $f_B$ represents back focal length of the lens system and symbol $f_{123}$ represents the total focal length of the first, second and third lens components.

6. A retrofocus wide-angle lens system comprising a first lens component being a positive meniscus lens, a second lens component being a negative meniscus lens, a third lens component being a negative meniscus lens, a fourth lens component being a positive meniscus lens, a fifth lens component being a cemented negative doublet lens, and sixth and seventh lens components being positive lenses, and said retrofocus wide-angle lens system having the following numerical data:

$r_1 = 0.8343$
$d_1 = 0.1292$  $n_1 = 1.72$  $\nu_1 = 50.4$
$r_2 = 2.5745$
$d_2 = 0.0039$
$r_3 = 1.4787$
$d_3 = 0.0388$  $n_2 = 1.618$  $\nu_2 = 63.4$
$r_4 = 0.3284$
$d_4 = 0.1309$
$r_5 = 1.4978$
$d_5\ 32\ 0.0388$  $n_3 = 1.6485$  $\nu_3 = 53.0$
$r_6 = 0.5737$
$d_6 = 0.1037$
$r_7 = 0.7825$
$d_7 = 0.4295$  $n_4 = 1.6261$  $\nu_4 = 39.1$
$r_8 = 3.8596$
$d_8 = 0.0517$
$r_9 = 1.8316$
$d_9 = 0.1570$  $n_5 = 1.762$  $\nu_5 = 40.2$
$r_{10} = -0.8117$
$d_{10} = 0.0858$  $n_6 = 1.8052$  $\nu_6 = 25.4$
$r_{11} = 1.6849$
$d_{11} = 0.0473$
$r_{12} = -1.5176$
$d_{12} = 0.0737$  $n_7 = 1.6968$  $\nu_7 = 55.6$
$r_{13} = -0.5620$
$d_{13} = 0.0039$
$r_{14} = -18.9612$
$d_{14} = 0.0753$  $n_8 = 1.734$  $\nu_8 = 51.5$
$r_{15} = -1.3937$
$f = 1.0$
$f_B = 1.4473$
$f_{123} = -0.701$
$D_4 = d_7$
$D_5 = d_9 + d_{10}$ where reference symbols $r_1$ through $r_{15}$ represent radii of curvature of successive lenses, reference symbols $d_1$ through $d_{14}$ represent thickness of successive lenses and distances between lenses on the axis, reference symbols $n_1$ through $n_8$ represent refractive indexes of successive lenses, $\nu_1$ through $\nu_8$ represent Abbe's number of successive lenses, reference symbol $f$ represents the total focal length of the whole lens system, reference symbol $f_B$ represents back focal length of the lens system and symbol $f_{123}$ represents the total focal length of the first, second and third lens components.

7. A retrofocus wide-angle lens system comprising a first lens component being a positive meniscus lens, a second lens component being a negative meniscus lens, a third lens component being a negative meniscus lens, a fourth lens component being a cemented positive doublet lens, a fifth lens component being a cemented negative doublet lens, and sixth and seventh lens components being positive lenses, and said retrofocus wide-angle lens systems having the following numerical data:

$r_1 = 0.8404$
$d_1 = 0.1292$  $n_1 = 1.72$  $\nu_1 = 50.4$
$r_2 = 2.5703$
$d_2 = 0.0038$
$r_3 = 1.4611$
$d_3 = 0.0388$  $n_2 = 1.618$  $\nu_2 = 63.4$
$r_4 = 0.3275$
$d_4 = 0.1308$
$r_5 = 1.5280$
$d_5 = 0.0388$  $n_3 = 1.6485$  $\nu_3 = 53.0$
$r_6 = 0.5965$
$d_6 = 0.1168$
$r_7 = 0.7924$
$d_7 = 0.0396$  $n_4 = 1.6676$  $\nu_4 = 41.9$
$r_8 = 0.5388$
$d_8\ 32\ 0.3785$  $n_5 = 1.6261$  $\nu_5 = 39.1$
$r_9 = 3.1889$
$d_9 = 0.0517$
$r_{10} = 1.5540$
$d_{10} = 0.1498$  $n_6 = 1.762$  $\nu_6 = 40.2$
$r_{11} = -0.8097$
$d_{11} = 0.0932$  $n_7 = 1.8052$  $\nu_7 = 25.4$
$r_{12} = 1.5325$
$d_{12} = 0.0473$
$r_{13} = -1.5070$
$d_{13} = 0.0737$  $n_8 = 1.6968$  $\nu_8 = 55.6$
$r_{14} = -0.5633$
$d_{14} = 0.0038$

-Continued $r_{15} = -38.4579$
$\quad d_{15} = 0.0753 \quad n_9 = 1.734 \quad \nu_9 = 51.5$
$r_{16} = -1.4308$
$f = 1.0$
$f_B = 1.4549$
$f_{123} = -0.714$
$D_4 = d_7 + d_8$
$D_5 = d_{10} + d_{11}$ where reference symbols $r_1$ through $r_{16}$ represent radii of curvature of successive lenses, reference symbols $d_1$ through $d_{15}$ represent thickness of successive lenses and distances between lenses on the axis, reference symbols $n_1$ through $n_9$ represent refractive indexes of successive lenses, $\nu_1$ through $\nu_9$ represent Abbe's number of successive lenses, reference symbol $f$ represents the total focal length of the whole lens system, reference symbol $f_B$ represents back focal length of the lens system and symbol $f_{123}$ represents the total focal length of the first, second and third lens components.

8. A retrofocus wide-angle lens system comprising a first lens component being a positive meniscus lens, a second lens component being a negative meniscus lens, a third lens component being a negative meniscus lens, a fourth lens component being a cemented positive triplet lens, a fifth lens component being a cemented negative doublet lens, and sixth and seventh lens components being positive lenses, and said retrofocus wide-angle lens system having the following numerical data:

$r_1 = 0.8299$
$\quad d_1 = 0.1290 \quad n_1 = 1.72 \quad \nu_1 = 50.4$
$r_2 = 2.5764$
$\quad d_2 = 0.0038$
$r_3 = 1.4996$
$\quad d_3 = 0.0387 \quad n_2 = 1.618 \quad \nu_2 = 63.4$
$r_4 = 0.3282$
$\quad d_4 = 0.1307$
$r_5 = 1.5117$
$\quad d_5 = 0.0387 \quad n_3 = 1.6485 \quad \nu_3 = 53.0$
$r_6 = 0.5629$
$\quad d_6 = 0.1079$
$r_7 = 0.7628$
$\quad d_7 = 0.0395 \quad n_4 = 1.6676 \quad \nu_4 = 41.9$
$r_8 = 0.5353$
$\quad d_8 = 0.1845 \quad n_5 = 1.6261 \quad \nu_5 = 39.1$
$r_9 = 2.1167$
$\quad d_9 = 0.2064 \quad n_6 = 1.6237 \quad \nu_6 = 46.9$
$r_{10} = 3.8690$
$\quad d_{10} = 0.0516$
$r_{11} = 1.6059$
$\quad d_{11} = 0.1570 \quad n_7 = 1.762 \quad \nu_7 = 40.2$
$r_{12} = -0.8091$
$\quad d_{12} = 0.0823 \quad n_8 = 1.8052 \quad \nu_8 = 25.4$
$r_{13} = 1.5350$
$\quad d_{13} = 0.0472$
$r_{14} = -1.4575$
$\quad d_{14} = 0.0736 \quad n_9 = 1.6968 \quad \nu_9 = 55.6$
$r_{15} = -0.5545$
$\quad d_{15} = 0.0038$
$r_{16} = -121.6048$
$\quad d_{16} = 0.0752 \quad n_{10} = 1.734 \quad \nu_{10} = 51.5$
$r_{17} = -1.4855$
$f = 1.0$
$f_B = 1.4536$
$f_{123} = -0.688$
$D_4 = d_7 + d_8 + d_9$
$D_5 = D_{11} + d_{12}$ where reference symbols $r_1$ through $r_{17}$ represent radii of curvature of succccessive lenses, reference symbols $d_1$ through $d_{16}$ represent thickness of successive lenses and distances between lenses on the axis, reference symbols $n_1$ through $n_{10}$ represent refractive indexes of successive lenses, $\nu_1$ through $\nu_{10}$ represent Abbe's number of successive lenses, reference symbol $f$ represents the total focal length of the whole lens system, reference symbol $f_B$ represents back focal length of the lens system and symbol $f_{123}$ represents the total focal length of the first, second and third lens components.

9. A retrofocus wide-angle lens system comprising a first lens component being a positive meniscus lens, a second lens component being a negative meniscus lens, a third lens component being a negative meniscus lens, a fourth lens component being a combined lens comprising a positive doublet lens and a positive lens arranged leaving a small airspace, a fifth lens component being a cemented negative doublet lens, and sixth and seventh lens components being positive lenses, and said retrofocus wide-angle lens system having the following numerical data:

$r_1 = 0.8352$
$\quad d_1 = 0.1290 \quad n_1 = 1.72 \quad \nu_1 = 50.4$
$r_2 = 2.5729$
$\quad d_2 = 0.0038$
$r_3 = 1.5009$
$\quad d_3 = 0.0387 \quad n_2 = 1.618 \quad \nu_2 = 63.4$
$r_4 = 0.3300$
$\quad d_4 = 0.1306$
$r_5 = 1.5990$
$\quad d_5 = 0.0387 \quad n_3 = 1.6485 \quad \nu_3 = 53.0$
$r_6 = 0.5789$
$\quad d_6 = 0.1095$
$r_7 = 0.7756$
$\quad d_7 = 0.0395 \quad n_4 = 1.6676 \quad \nu_4 = 41.9$
$r_8 = 0.5351$
$\quad d_8 = 0.1753 \quad n_5 = 1.6261 \quad \nu_5 = 39.1$
$r_9 = 1.9263$
$\quad d_9 = 0.0082$
$r_{10} = 1.7459$
$\quad d_{10} = 0.2058 \quad n_6 = 1.6237 \quad \nu_6 = 46.9$
$r_{11} = 3.6218$
$\quad d_{11} = 0.0516$
$r_{12} = 1.5649$
$\quad d_{12} = 0.1569 \quad n_7 = 1.762 \quad \nu_7 = 40.2$
$r_{13} = -0.8088$
$\quad d_{13} = 0.0889 \quad n_8 = 1.8052 \quad \nu_8 = 25.4$
$r_{14} = 1.4895$
$\quad d_{14} = 0.0472$
$r_{15} = -1.3814$
$\quad d_{15} = 0.0735 \quad n_9 = 1.6968 \quad \nu_9 = 55.6$
$r_{16} = -0.5552$
$\quad d_{16} = 0.0038$
$r_{17} = 28.8360$
$\quad d_{17} = 0.0752 \quad n_{10} = 1.734 \quad \nu_{10} = 51.5$
$r_{18} = -1.5345$
$f = 1.0$
$f_B = 1.4480$
$f_{123} = -0.693$
$D_4 = d_7 + d_9 + d_{10}$
$D_5 = d_{12} + d_{13}$ where reference symbols $r_1$ through $r_{18}$ represent radii of curvature of successive lenses, reference symbols $d_1$ through $d_{17}$ represent thickness of successive lenses and distances between lens on the axis, reference symbols $n_1$ through $n_{10}$ represent refractive indexes of successive lenses, $\nu_1$ through $\nu_{10}$ represent Abbe's number of successive lenses, reference symbol $f$ represents the total focal length of the whole lens system, reference symbol $f_B$ represents back focal length of the lens system and symbol $f_{123}$ represents the total focal length of the first, second and third lens components.

10. A retrofocus wide-angle lens system consisting of a first lens component being a positive meniscus lens, a second lens component being a negative meniscus lens, a third lens component being a negative meniscus lens, fourth lens component means having a positive refractive power, fifth lens component means having a negative refractive power, a sixth lens component being a positive lens, and a seventh lens component being a positive lens, and said retrofocus wide-angle lens system satisfying the following conditions:

$0.64f < |f_{123}| < 0.72f, f_{123} < 0$ $0.65f < D_4 + D_5 < 0.84f$ where reference symbol $f$ represents the total focal length of the lens system as a whole, reference symbol $f_{123}$ represents the total focal length of said first, second and third lens components, reference symbol $D_4$ represents the distance from the front surface to the rear surface of said fourth lens component means and reference symbol $D_5$ represents the distance from the front surface to the rear surface of said fifth lens component means.

* * * * *